Nov. 7, 1967    E. M. WINKLER ET AL    3,351,799
4-RING, 3-PHASE, A.C. ARC HEATER
Filed March 10, 1966    2 Sheets-Sheet 1

Eva M. Winkler
Richard L. Humphrey
INVENTORS

BY
J. O. Tresansky
ATTORNEY
Charles L. Whitham
AGENT

Eva M. Winkler
Richard L. Humphrey
INVENTORS 3,351,799
4-RING, 3-PHASE, A.C. ARC HEATER
Eva M. Winkler, Adelphi, and Richard L. Humphrey, Beltsville, Md., assignors to the United States of America as represented by the Secretary of the Navy
Filed Mar. 10, 1966, Ser. No. 534,991
9 Claims. (Cl. 313—231)

ABSTRACT OF THE DISCLOSURE

An arc heater is provided having a chamber with four split-ring electrodes. The first and fourth electrodes are connected to the same phase of a polyphase source; the other two electrodes to the other two phases. Gas is injected through insulators surrounding the electrode legs. Operation is initiated by wrapping around the electrodes a thin conductor which vaporizes when power is applied in order to establish an arc column. Water cooling is provided.

---

The invention described herein may be manufactured and used by or for the Government of the United States of America for governmental purposes without the payment of any royalties thereon or therefor.

This invention relates generally to arc heaters, and more particularly to an A.C. heater for heating the supply gas of a hypervelocity wind tunnel where extremely high gas temperatures are required.

Wind tunnels have always played a substantial role in the development of vehicles in the fields of aeronautics and ballistics. With the continuous increase of the speed of airplanes, missiles, and space vehicles, wind tunnels have had to be developed to provide adequate simulation of high-velocity, high-temperature flight conditions in the laboratory. Some of the modern wind tunnels use arc heaters or electro-magnetic accelerators to obtain the required high-speed gas flows. The arc tunnel is today the only practicable way known to continuously simulate the very high temperature flow a vehicle experiences during re-entry into the Earth's atmosphere. Most arc tunnels use D.C. power for their heaters, although some variants use single-phase A.C. power. Direct current arcs have inspired a great deal of experimental and theoretical work which now makes it possible to build D.C. arc heaters of very high performance. Alternating current arcs on the other hand have been comparatively undeveloped, and performance levels are generally lower. A.C. arcs, however, promise a considerable economic advantage if their performance can be brought close to that of D.C. arcs. For an A.C. arc, A.C. to D.C. conversion equipment would not be needed. The saving in facility investment becomes more important as arc heaters increase in size to power levels over one megawatt.

It is therefore an object of the instant invention to provide a high-performance A.C. arc heater for a hypervelocity wind tunnel.

It is another object of this invention to provide an A.C. arc heater in which arc rotation and gas heating are more uniform and overheating of the electrodes is practically absent with the result that gas contamination is reduced correspondingly.

It is a further object of the invention to provide an arc heater for a wind tunnel that is cheaper to build, operate and maintain than previous ones.

According to the present invention, the foregoing and other objects are attained by providing within the heater pressure chamber four circular or square split-ring electrodes of equal size. The first and fourth electrodes are connected to the same phase of a three-phase power source; and the other two electrodes, to the other two phases. Each electrode is cooled by water circulated under pressure. The chamber comprises an inner water-cooled liner and a high pressure outer shell. Air is injected under high pressure through orifices in insulators surrounding the electrode legs. An arc column is established by wrapping a thin conductor around the electrodes, and, when power is applied, the thin conductor vaporizes. The column thus established is then driven around the rings by the electrode current-induced magnetic field. The injected air is heated as it passes the arc column and then discharges through a water-cooled nozzle.

The specific nature of the invention, as well as other objects, aspects, uses and advantages thereof, will clearly appear from the following description and from the accompanying drawing, in which.

Figure 1:
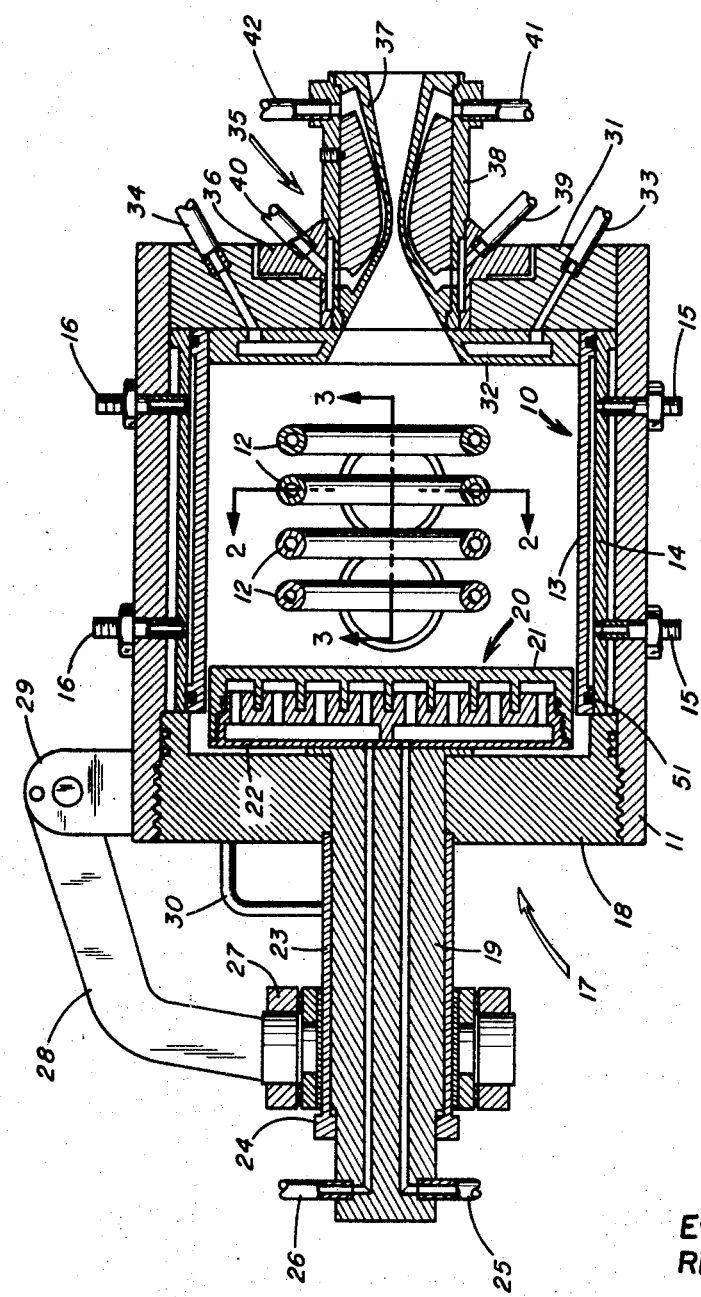
FIG. 1 is a cross-sectional view of the electrode and pressure chamber assembly.

Referring now to the drawing wherein like reference numerals designate identical parts throughout the several views, and more particularly to FIG. 1, the heater chamber comprises a cylindrical water-cooled liner 10 concentrically positioned within a cylindrical steel pressure shell 11. Four split-ring electrodes 12 are individually mounted through the chamber wall. The electrodes are identical in size and shape and arranged in the arc chamber so that the chamber axis coincides with the electrode-ring axes. The spacing between electrodes is uniform. The upstream and downstream electrodes are electrically connected to the same phase of a three-phase power supply. The other two electrodes are connected to the remaining two phases. This permits all arc paths to be the same length. The electrodes are made of heavy-wall, high-density copper tubing and may be either circular or square planform. The square planform is preferred since this geometry has been found to reduce the radial component of the arc column and to lessen the excursions of the arc column. The water-cooled liner 10 is preferably made of copper and constructed in two parts: an inner cylindrical shell 13 having outwardly extending flanges at either end, and an outer shell 14. The flanges on inner shell 13 have grooves cut therein which support rubber O rings 51 that sealingly engage the inner periphery of outer shell 14 thereby forming a water cavity within liner 10. A pair of water inlet fittings 15 are positioned at the bottom of the chamber, passing through the pressure shell 11 and threading into the outer shell 14 of liner 10 providing ingress to the cavity therein. A pair of water outlet fittings 16 are positioned at the top of the chamber diametrically opposite fittings 15. Fittings 16 pass through pressure shell 11 and thread into shell 14 providing egress from the cavity in liner 10. Water is introduced at the bottom of liner 10 through fittings 15 and discharged from the top by way of fittings 16. In this manner trapped pockets of steam and air are avoided thereby providing reliable and efficient cooling of the liner 10. Access to the interior of the chamber is gained through a ⅙ turn hinged breech type closure 17. Closure 17 comprises a head piece 18 which threadingly and sealingly engages the rear portion of pressure shell 11. Positioned in front of head piece 18 and supported by a concentric shaft 19 passing therethrough is a water-cooled liner 20. Shaft 19 may be machined as an integral part of head piece 18 and has two water passages drilled through most of its length parallel to the axis of the shaft. These water passages enter into the interior of water-cooled liner 20. Liner 20 is constructed in two pieces: a ribbed copper face 21, smooth surface of which forms the rear surface of the chamber, and a steel supporting structure 22 which supports the copper face. The steel supporting structure 22 defines a lower and an upper water manifold which communicate with the lower and upper water passages, respectively, in shaft 19. Each manifold opens into the volumes between ribs on the copper face 21. The copper face 21 threadably engages support structure 22 about its outer periphery, the ribs of face 21 partially projecting into reliefs in structure 22. Shaft 19 is jacketed along most of its length by a bearing surface 23 which frictionally engages shaft 19 and is welded at its junction with head piece 18. Bearing surface 23 is terminated by collar 24 which threadably engages shaft 19. Beyond collar 24 are two water fittings 25 and 26 which thread into shaft 19 providing access to the lower and upper water passages, respectively, in shaft 19. Water for cooling liner 20 is pumped into the lower water passage at fitting 25 and from there passes into the lower manifold of support structure 22. The water then flows into the volumes between the ribs in copper face 21, circulating upward and passing into the upper manifold in structure 22. From there the water passes through the upper water passage in shaft 19 and out fitting 26. A hinge collar 27 slidably engages the bearing surface 23 on shaft 19. A hinge arm 28 is fixedly attached to collar 27 and pivotally attached to an outwardly projecting tab 29 on pressure shell 11. A handle 30 fixedly attached to head piece 18 facilitates access to the interior of the chamber. Using handle 30 head piece 18 and shaft 19 are rotated ⅙ turn with shaft 19 slidably rotating within collar 27. Head piece 18 is then pulled rearwardly, shaft 19 sliding transversely through collar 27. When liner 20 clears shell 11, the closure assembly 17 is then swung out of the way. The forward end of the chamber is partially closed by an annular ring 31 which is welded about its periphery to pressure shell 11. Facing the interior of ring 31 is a water-cooled copper liner 32 in the form of a hollow annular ring. An inlet water fitting 33 passes through the lower part of ring 31 extending from the face thereof into and threadably engaging liner 32. A corresponding outlet water fitting 34 in communication with the interior of liner 32 is positioned at the upper part of ring 31. As before, water is circulated under pressure from the bottom to the top of liner 32. A water-cooled gas exhaust nozzle assembly 35 is positioned within and projects out of the opening in ring 31. Nozzle assembly is held in place by collar 36 which is positioned in an annular relief cut in the exposed face of ring 31 about the opening therein. Collar 36 is held in place by bolts (not shown). The interior surface of the opening in liner 32 mates smoothly with the converging inlet of nozzle assembly 35. The nozzle assembly 35 is constructed in two main parts; the converging-diverging nozzle 37, which is made of copper, and a surrounding water jacket 38. Water jacket 38 is appropriately baffled to cause the water flow therethrough to be a maximum adjacent the inner surface of nozzle 37 thus promoting maximum cooling. Water under pressure enters the water jacket cavity through water fittings 39 and 40 which pass through collar 36 at the top and bottom, respectively, diagonally inwardly. The water exhausts through water fittings 41 and 42 at the outwardmost portion of water jacket 38. Fittings 41 and 42 may be formed as an integral part of jacket 38.

Figure 2:
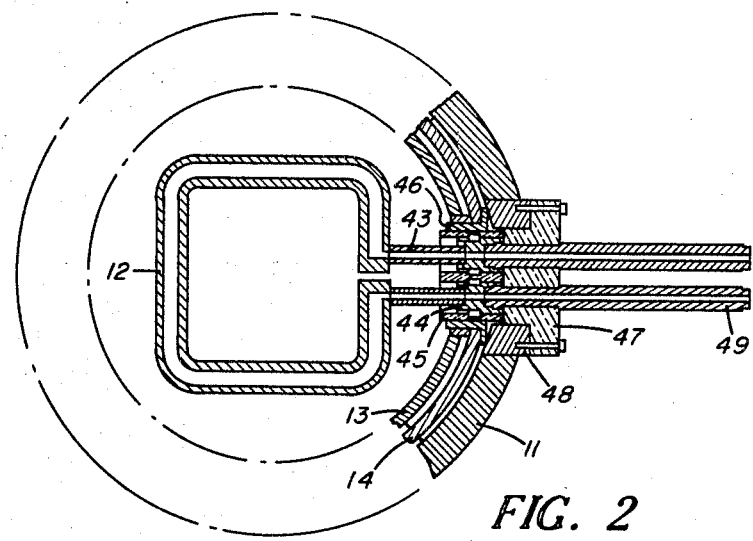
FIG. 2 is a cross-sectional view of the electrode subassembly taken perpendicular to the longitudinal axis of the heater.
Figure 3:
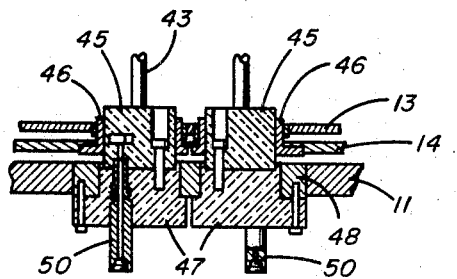
FIG. 3 is a cross-sectional view of the electrode subassembly taken parallel to the longitudinal axis of the heater.

Referring now to the split ring sub-assembly as shown in FIGS. 2 and 3, the electrodes 12 are each supported by a pair of legs 43 which lie in the plane of the electrode ring. The supporting legs 43 are made of smaller diameter copper tubes welded to the electrode rings. This fabrication permits the gap in the electrode rings to be very narrow and allows the legs to be spaced further apart than if the legs and electrode ring were formed of one continuous piece of tubing. Adequate cooling is provided, and the tendency of the arc column to travel down the legs is minimized. Each supporting leg is welded to an electrode connector 44. Connectors 44 are generally cylindrical bodies made of copper and having a bore therethrough which is in axial registry with the electrode legs 43. A groove is cut about the circumference of the connectors 44 about midway along their lengths, and a plurality of small orifices are drilled parallel to the axis of the connector about the electrode legs and extending into the groove. Each pair of electrode connectors 44 are frictionally pressed into respective bores extending through an insulating block 45 of which there are four. Two blocks are positioned in one side wall of the chamber and support the first and third electrodes, and the other two blocks are positioned in the other side wall and support the second and fourth electrodes. Insulating blocks 45 are conveniently cylindrical in shape and made of foamed fused silica ceramic. The bores in the insulating blocks 45 which receive electrode connectors 44 are parallel to the axis of the blocks and located along a common diameter. Each bore has a groove cut in the wall thereof which is in registry with the groove cut in the corresponding connector. When the electrode connectors 44 and insulating blocks 45 are assembled, these grooves define air plenums each of which communicates with the several orifices drilled about the respective electrode legs 43. A third bore, shown in FIG. 3, parallel to the axis of the insulating blocks 45 and located in a plane perpendicular to the common plane in which the electrode connector bores are located extends from the face of the insulating blocks 45 opposite the electrodes 12 part way into the blocks. This third bore terminates in a plenum chamber that intersects the plenum chambers encircling each pair of electrode connectors 44. Each insulating block 45 is held in place by a collar 46 which is screwed into liner 10. In addition, each insulating block 45 is screwed to a corresponding insulating block 47 which extends to the exterior of the chamber. These insulating blocks 47 are in turn screwed to a collar 48 which is welded to pressure shell 11. Tubular fittings 49 (shown only in FIG. 2 for clarity) pass through insulating blocks 47 and thread into electrode connectors 44 in axial registry therewith, acting to support the electrode assembly. Fittings 49 thus provide both electrical connection to their respective electrodes 12 and passage for water supplied under pressure which cools the electrodes. A tubular air supply fitting 50 (shown only in FIG. 3 for clarity), one for each of insulating blocks 45, threads into insulating block 47 and extends into the third bore of insulating block 45. Air is then supplied under pressure by way of fittings 50 to the several plenums in their corresponding insulating blocks 45. These plenums then supply air under equal pressures to the plurality of orifices drilled about the electrode legs 43. This air injection around the electrode legs 43 helps to prevent the arc column from progressing down the legs and allows each electrode to operate in an area of constant temperature and thus constant voltage. This method of air injection has the further benefit of reducing the bulk rotation of gas in the chamber. A reduction of the gas rotation reduces the convection loss to the liner walls. The entire electrode assemblies are sealed and made air-tight by rubber O rings strategically located at the junction of the several components thereof. There are a number of advantages to the electrode assemblies just described. These include ease of installation and economical replacement.

It will be apparent that the embodiment shown is only exemplary and that various modifications can be made in construction and arrangement within the scope of the invention as defined in the appended claims.

We claim as our invention:

1. An A.C. arc heater for heating the supply gas of a hypervelocity wind tunnel where extremely high gas temperatures are required, comprising a heater pressure chamber having a gas discharge nozzle at one end thereof, the other end being closed, four split-ring electrodes of equal size and geometry uniformly spaced along the axis of said camber, the axes of said electrodes coinciding with the axis of said chamber, the first and fourth of said electrodes being connected to the same phase of a three-phase power supply and the second and third of said electrodes respectively being connected to the remaining two phases, and means for supplying gas under pressure to the interior of said chamber, the gas so supplied being heated by an arc column established between said electrodes thereby causing it to attain very high energy before exhausting through said nozzle.

2. An A.C. heater as recited in claim 1 further comprising:

a pair of electrode support legs for each of said split ring electrodes, one end of each of said pair of legs being rigidly attached to a corresponding electrode on either side of the gap therein, the other end of each pair of legs projecting toward the interior walls of said chamber, an insulator surrounding each pair of electrode support legs and electrically insulating each electrode support leg from every other electrode support leg, means for securing said insulator into the side walls of said chamber, and electrical conductor means electrically connected to said electrode support legs and passing through said insulator to the exterior of said chamber to facilitate electrical connection of said electrodes to a source of three-phase power.

3. An A.C. heater as recited in claim 2 wherein said insulator has a plenum chamber therein adjacent each of said electrode support legs and a plurality of orifices drilled about said electrode support legs in fluid communication with said plenum and said means for supplying gas comprises a fluid conduit extending from without said chamber, through said insulator and in fluid communication with said plenum.

4. An A.C. heater as recited in claim 3 wherein said electrodes, said electrode support legs, and said electrical conductor means are made of tubular conduit and fabricated to permit the flow of water under pressure through said electrodes.

5. An A.C. heater as recited in claim 4 wherein said electrodes have a circular planform.

6. An A.C. heater as recited in claim 4 wherein said electrodes have a square planform.

7. An A.C. heater as recited in claim 4 wherein said insulator is constructed in two parts, an outer part being securely installed in the walls of said chamber and an inner part which carries said electrode support legs being detachably connected to said outer part.

8. An A.C. heater as recited in claim 7 wherein the closed end of said chamber comprises a breech-type closure to provide ready access to the interior of said chamber.

9. An A.C. heater as recited in claim 4 wherein the interior surfaces and said gas discharge nozzle are water-cooled.

References Cited

UNITED STATES PATENTS

| | | | |
|---|---|---|---|
| 3,048,736 | 8/1962 | Emmerich | 313—231 |
| 3,097,321 | 7/1963 | Le Row et al. | 313—231 |
| 3,146,371 | 8/1964 | McGinn | 313—231 |
| 3,213,260 | 10/1965 | Hammer | 313—231 |
| 3,283,205 | 11/1966 | De Bolt | 315—111 |

OTHER REFERENCES

German printed application No. 1,106,887, May 1961.

DAVID J. GALVIN, *Primary Examiner.*

STANLEY D. SCHLOSSER, *Examiner.*